(12) United States Patent
Crawford et al.

(10) Patent No.: US 9,240,209 B1
(45) Date of Patent: Jan. 19, 2016

(54) PASS-THROUGH TAPE ACCESS IN A DISK STORAGE ENVIRONMENT

(71) Applicant: International Business Machines Corporation, Armonk, NY (US)

(72) Inventors: Joshua J. Crawford, Tucson, AZ (US); Paul A. Jennas, II, Tucson, AZ (US); Jason L. Peipelman, Vail, AZ (US); Matthew J. Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/502,218

(22) Filed: Sep. 30, 2014

(51) Int. Cl.
*G11B 5/02* (2006.01)
*G11B 15/46* (2006.01)
*G11B 20/12* (2006.01)
*G11B 27/34* (2006.01)

(52) U.S. Cl.
CPC ............ *G11B 20/1201* (2013.01); *G11B 27/34* (2013.01); *G11B 2020/1267* (2013.01)

(58) Field of Classification Search
CPC ........ G11B 5/00; G11B 5/588; G11B 5/5508; G11B 5/5504; G11B 27/3027; G11B 2220/20; G11B 5/012; G11B 27/107; G11B 5/52; G11B 15/442
USPC ................ 360/48, 49, 55, 72.2, 73.04, 77.06, 360/77.12, 78.02, 83, 90
See application file for complete search history.

(56) References Cited

U.S. PATENT DOCUMENTS

| | | | |
|---|---|---|---|
| 6,880,040 B2 * | 4/2005 | Basham et al. | ............... 711/111 |
| 7,325,159 B2 | 1/2008 | Stager et al. | |
| 7,529,966 B2 | 5/2009 | Cochran et al. | |
| 7,853,764 B2 | 12/2010 | Bitner et al. | |
| 8,065,271 B2 | 11/2011 | Mizuno | |
| 8,099,572 B1 | 1/2012 | Arora et al. | |
| 2014/0075440 A1 | 3/2014 | Prahlad et al. | |

OTHER PUBLICATIONS

Jennas, P. et al, "Tape Backup and Restore in a Disk Storage Environment," U.S. Appl. No. 14/463,705, filed Aug. 20, 2014.

* cited by examiner

*Primary Examiner* — Nabil Hindi
(74) *Attorney, Agent, or Firm* — Scott S. Dobson; Jennifer M. Anda

(57) ABSTRACT

A command to write data to a virtual location is received at a disk storage system. The virtual location is mapped to a tape storage system. A record is generated including the data, the virtual location, and a sequence value. The sequence value indicates relative sequence when compared to other sequence values. The record is written to a record location on a tape cartridge loaded in a tape drive. Record metadata on the disk storage system is modified to indicate that the first record location contains the first record. The data on the record can be read from the tape cartridge.

20 Claims, 7 Drawing Sheets

300

| Track ID | Sequence # |
|---|---|
| fb_0001 A | 4225 |
| fb_0001 E | 3945 |
|  |  |
| fb_0001 B | 1245 |
| fb_0001 C | 1246 |
|  |  |
| fb_0001 D | 189 |
|  |  |

700

| Track ID | Tape Cartridge | Cartridge Address | Sequence # |
|---|---|---|---|
| fb_0001 A | AAA001 | 0x375 | 4225 |
| fb_0001 B | AAA001 | 0x1A6 | 1245 |
| fb_0001 C | AAA038 | 0x1A6 | 1246 |
| fb_0001 D | AAA001 | 0x51E | 189 |
| fb_0001 E | AAA038 | 0x008 | 3945 |
| ... | ... | ... | |

FIG. 7

PASS-THROUGH TAPE ACCESS IN A DISK STORAGE ENVIRONMENT

BACKGROUND

The present disclosure relates to computer storage, and more specifically, to log-structured tape storage in a disk storage environment.

Tape storage is sometimes used to backup data from disk storage. Although tape storage is slower than disk storage, tape storage provides backup storage at a low energy cost and allows data to survive for a long period of time in an encrypted format.

SUMMARY

According to embodiments of the present disclosure, a method for pass-through tape access in a disk storage environment is disclosed. The method includes receiving, at a disk storage system, a command to write data to a first virtual location. The first virtual location is mapped to a tape storage system. The method further includes generating a first record comprising the data, the first virtual location, and a first sequence value. The first sequence value indicates relative sequence when compared to other sequence values. The method further includes writing the first record to a first record location on a first tape cartridge loaded in a tape drive. The method further includes modifying record metadata on the disk storage system to indicate that the first record location contains the first record.

Further disclosed herein are embodiments of a system for pass-through tape access in a disk storage environment. The system includes a tape storage system with a set of tape cartridges and a disk storage system connected to the tape storage system. The disk storage system is configured to receive a command to write data to a first virtual location. The first virtual location is mapped to a tape storage system. The disk storage system is further configured to generate a first record comprising the data, the first virtual location, and a first sequence value. The first sequence value indicates relative sequence when compared to other sequence values. The disk storage system is further configured to write the first record to a first record location on a first tape cartridge loaded in a tape drive, and modify record metadata on the disk storage system to indicate that the first record location contains the first record.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 7 depicts an example record restore table.

Figure 1:
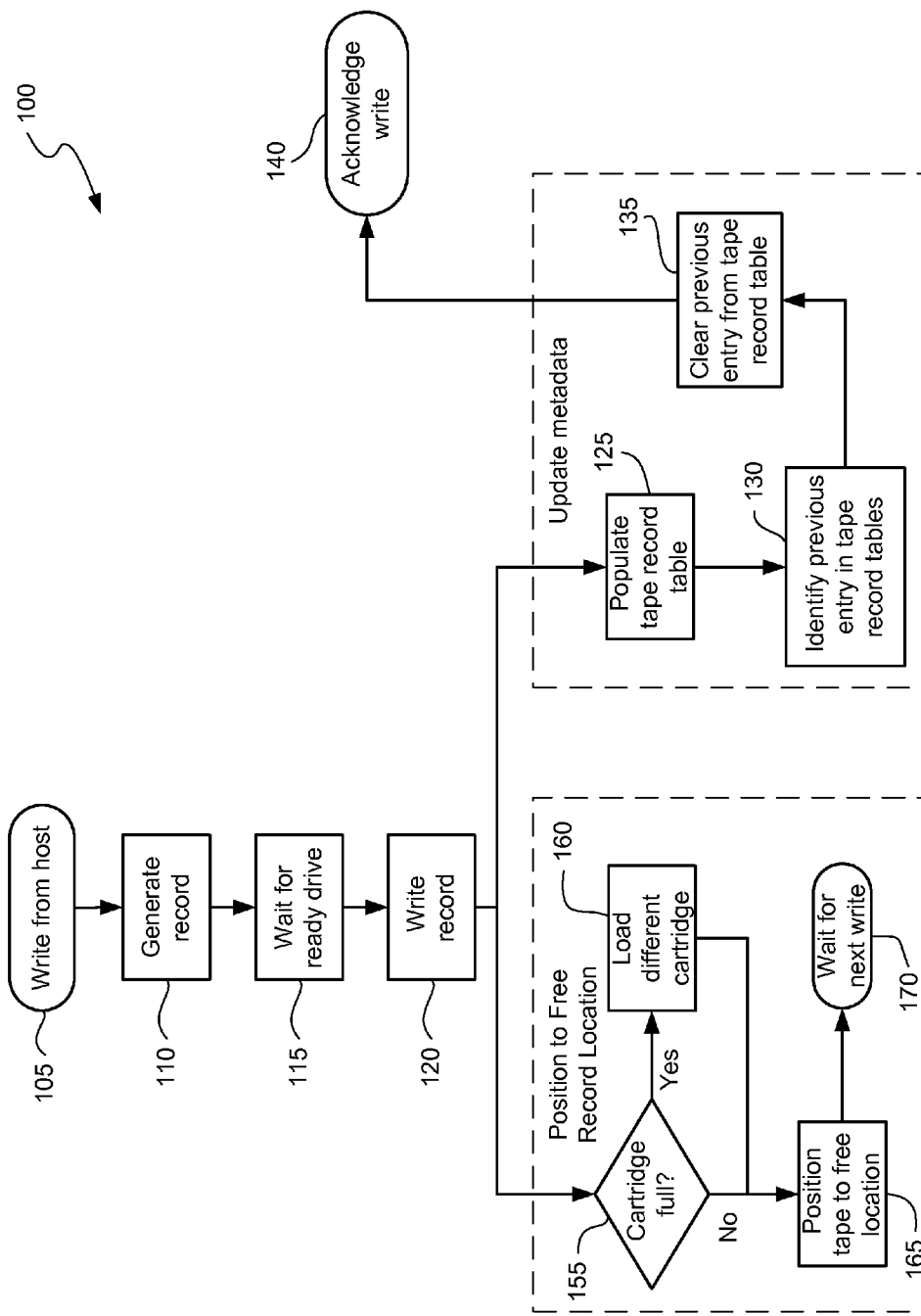
FIG. 1 depicts a flow diagram of an example method for writing to tape storage in a disk storage environment with log-structured tape access.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to pass-through log-structured tape access in a disk storage environment, and more particular aspects relate to restoring pass-through tape access. While the present disclosure is not necessarily limited to such applications, various aspects of the disclosure may be appreciated through a discussion of various examples using this context.

Embodiments of the present disclosure provide for writing data to tape storage, with a disk storage system acting as a pass-through device, by sequentially writing the data without needing to index the data at specific locations on the tape cartridges. Further embodiments of the present disclosure may provide for reading data from the tape storage system through the disk storage system.

The disk storage system configures a virtual location for host devices to read/write to which maps to the tape storage system. For example, the disk storage system may provide a virtual logical unit number (LUN) or other virtual volume identifier to a host system. When a write command is received at the disk storage system to write to the virtual location, the disk storage system generates a record containing the data, the virtual location and a sequence value. The disk storage system writes the record to a tape cartridge loaded in a tape drive. The virtual location and sequence value may be located in a header to simplify identification. The sequence values for the records indicate the sequence of the records when compared to each other. For example, the sequence value may be a number which increases sequentially for each record written to tape. Thus, a record with a higher sequence number indicates a more recent record than a record with a lower sequence number.

The tape storage system maintains metadata on the records. The metadata may include a tape record table for each tape cartridge with information on the current data records stored on the respective tape cartridge. Each entry in the tape record table may correspond to a specific record location. After writing a data record to tape storage, the disk storage system stores information on the record in the record metadata for the record location. Additionally, the disk storage system may identify information for a previous record associated with the same virtual disk location and clear the information. Clearing the information may indicate that the previous record location is free to be written to.

Additionally, after writing the record to tape storage, the tape cartridge is positioned at the next free record location. The next free record location may be determined by referencing the metadata. If the tape cartridge is full, a different tape cartridge is loaded into the tape drive and positioned at the next free record location. The record metadata may be referenced to identify a tape cartridge with the most free record locations in determining which tape cartridge to load into the tape drive.

When a read command is received at the disk storage system to read data from a virtual location mapped to the tape storage system, the disk storage system references the record metadata to determine a record location for a record associated with the virtual location. For example, the disk storage system may identify the virtual location in a tape record table to determine the record location of the record. The disk storage system determines if the tape cartridge containing the record is loaded, and loads the tape cartridge if it is not already loaded. The tape cartridge is positioned to the record location and the data is read off the record.

If the record metadata is lost on the disk storage system, the record metadata may be restored using information stored on the tape storage. The tape cartridges are scanned and virtual locations and sequence numbers for each record are read. This information may be located in a header for each record. A record restore table may be generated and populated with information read from the tape cartridges. The record restore table may include a virtual location, the record location, and a sequence value. For each record, the record restore table is populated for the virtual location if there is no previous record for the virtual location. If the record restore table is already populated for a given virtual location, the table is updated to reference the new record, including the record location and sequence number, if the sequence number for the record indicates a more recent record when compared to the sequence number in the table. If the sequence value indicates an older record, the record is ignored. This process may continue until all of the records are scanned through.

The completed record restore table indicates the most current record location for each disk location. This information may be used to restore the record metadata. Tape record tables may be generated for each tape cartridge and entries in the tape record tables may be populated using the record restore table. In some embodiments, a user may be presented with a list of virtual locations or virtual volumes which are available to be restored. The user may make a selection from the list and the virtual locations and record metadata may be restored using the record restore table.

Referring to FIG. 1, a flow diagram of an example method 100 for writing to tape storage in a disk storage environment with log-structured tape access is depicted. At block 105, a write command is received at a disk storage system to write data to a first virtual location mapped to a disk storage system. In response to receiving the write command, at block 110, a record is generated containing the first virtual location, the data, and a sequence value. At block 115, method 100 may wait for a ready tape drive which is loaded with a tape cartridge and positioned at a free record location. At block 120, the record is written to the free record location on the tape cartridge. In response to writing the record, method 100 proceeds to update metadata associated with the records and position a tape cartridge in the tape drive to a free record location.

At block 125, information about the data record is stored in the record metadata for the record location. For example, a tape record table may be populated with the first virtual disk location and sequence number in a location corresponding to the location of the data record on the tape cartridge. At block 130, information corresponding to a previous record for the first virtual disk location is identified. This may include identifying an entry in a tape record table which contains the first virtual disk location. At block 135, the information corresponding to the previous data record is cleared, indicating that the record location is free to be written to. Once the write has been processed on disk and the metadata has been updated, method 100 proceeds to block 140 and acknowledges the write to the host.

At block 155, it may be determined whether the tape cartridge is full. This may be determined by referencing metadata associated with the tape cartridge, such as a tape record table, to determine if there are more free record locations on the cartridge. If the tape cartridge is not full, method 100 may proceed to block 165. If the tape cartridge is full, method 100 may proceed to block 160, remove the tape cartridge and load a different cartridge into the tape drive before proceeding to block 165. The cartridge loaded may be the cartridge with the most free record locations as determined through metadata, such as tape record tables. At block 165, the loaded tape cartridge is positioned at a free record location. At block 170, the tape drive waits to write the next record.

Figure 2:
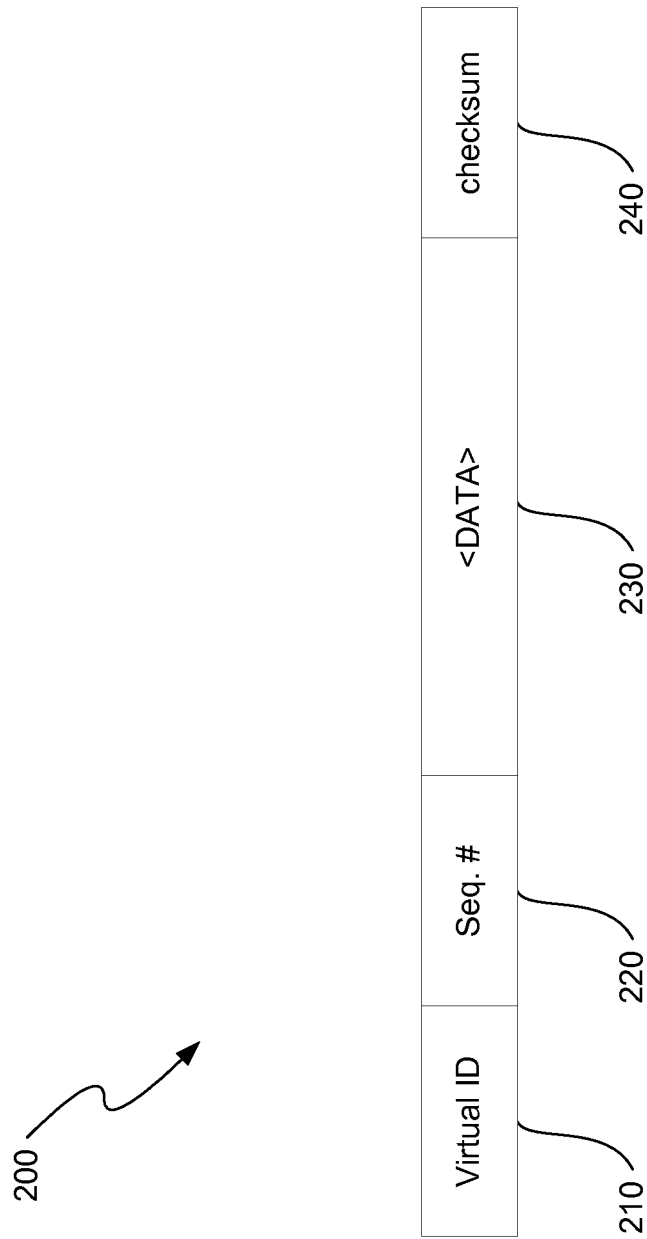
FIG. 2 depicts an example record for writing to tape storage.

Referring to FIG. 2, an example record 200 for writing to tape storage is depicted. Record 200 may include a virtual ID 210, sequence value 220, and data 230. Record 200 may additionally contain a checksum 240 or other validating value for detecting data corruption. Virtual ID 210 represents the virtual location which the data was written to. Sequence value 220 may indicate the relative sequence of records when compared to the sequence value of other records. Virtual ID 210 and sequence value 220 may be located in a header of record 200 to allow for a simpler retrieval of this information.

Figure 3:
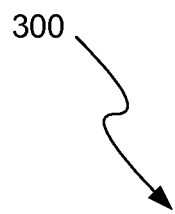
FIG. 3 depicts an example tape record table with record information for specific record locations.

Referring to FIG. 3, an example tape record table 300 with record information for specific record locations is depicted. Each row in tape record table 300 corresponds to a specific record location on a tape cartridge. A row is populated, with the track ID (virtual location) and sequence number, each time a new record is written to a virtual location mapped to tape storage with the row corresponding to the location of the record on the tape cartridge. A blank row indicates a record location which is free to be written to. The record location may not contain a record or may contain an old record which may be written over. There may be a separate tape record table for each tape cartridge in the tape storage library.

Figure 4:
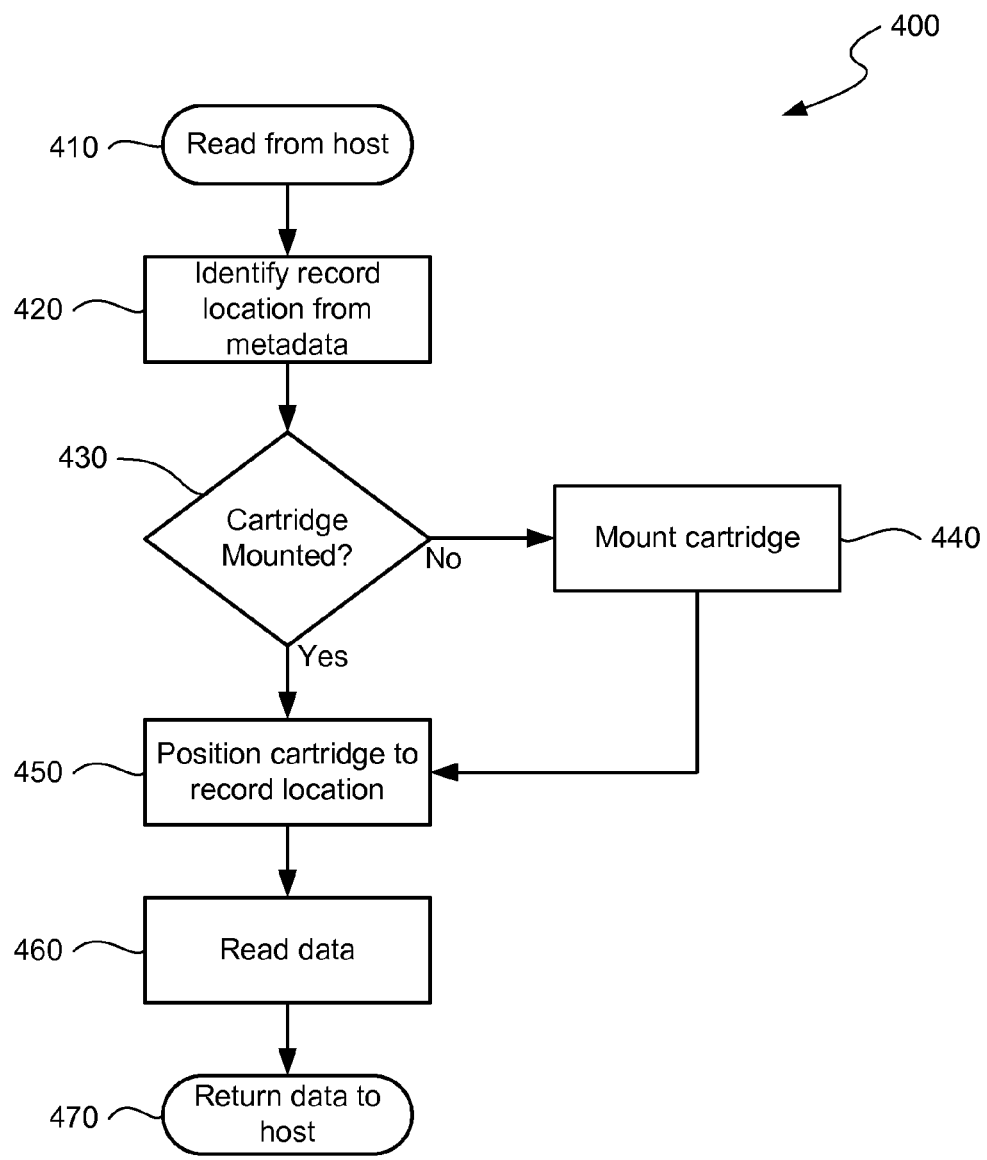
FIG. 4 depicts a flow diagram of an example method for reading data from tape storage in a disk storage system with log-structured tape access.

Referring to FIG. 4, a flow diagram of an example method 400 for reading data from tape storage in a disk storage system with log-structured tape access is depicted. At block 410, a read command is received from a host to read data from a virtual location mapped to a tape storage system. At block 420, a record location is identified, from record metadata, where a record containing the data is stored. This may include locating an entry containing the virtual location in a tape record table and determining the record location based on the location of the entry. At block 430, it is determined if the tape cartridge containing the record location is mounted in a tape drive. If the tape cartridge is not mounted in a tape cartridge, the cartridge is automatically mounted at block 440. At block 450, when the tape cartridge is mounted, the tape cartridge is positioned to the record location. At block 460, the data is read from the record. At block 470, the data is returned to the host.

Figure 5:
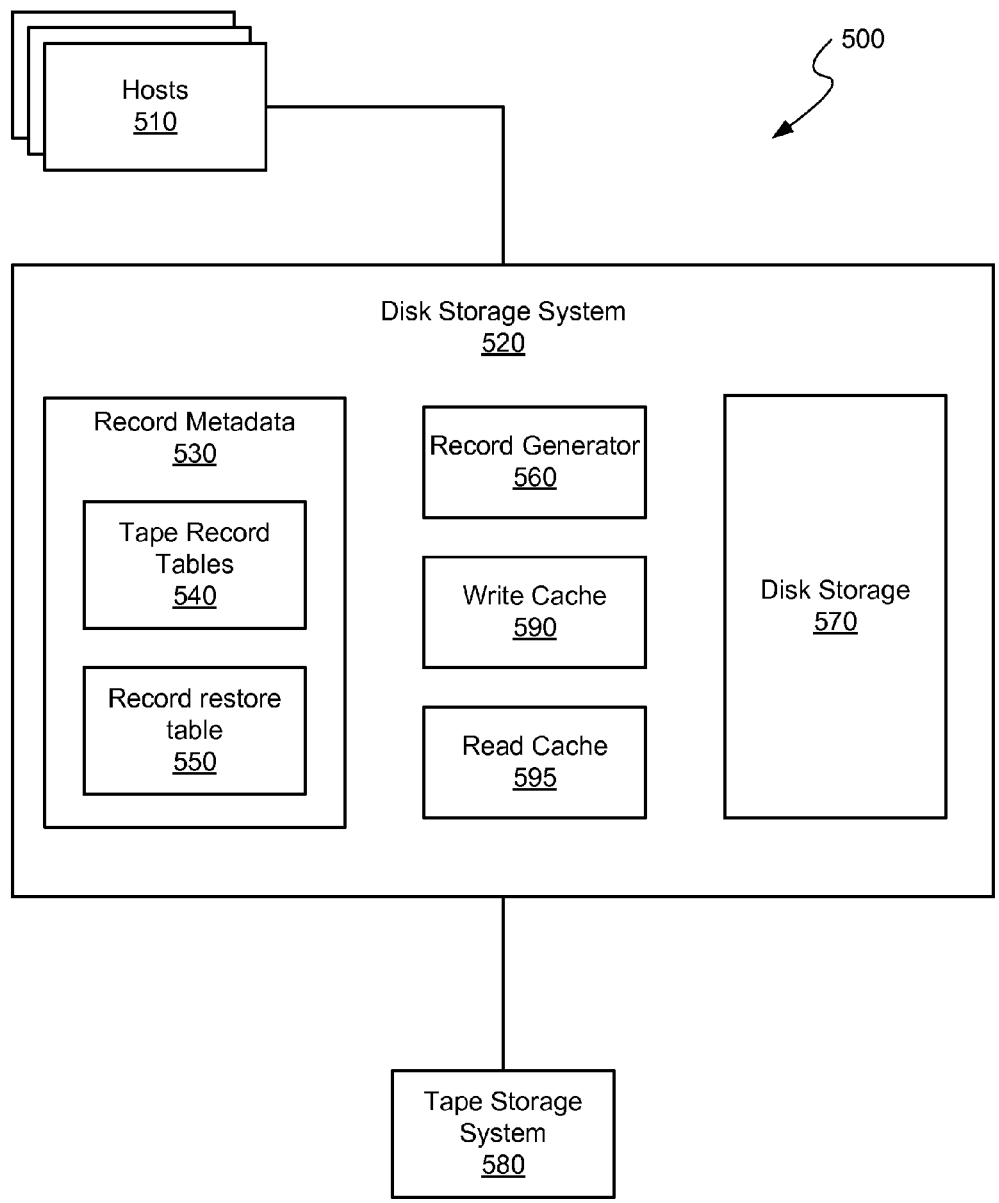
FIG. 5 depicts a block diagram of an example system for pass-through log-structured tape access in a disk storage environment.

Referring to FIG. 5, a block diagram of an example system 500 for pass-through log-structured tape access in a disk storage environment is depicted. System 500 may include one or more hosts 510, disk storage system 520, and tape storage system 580. The one or more hosts 510 may communicate read and write commands to disk storage system 520. The one or more hosts 510 may be any computing devices capable of sending read and write commands to disk storage system 520. Disk storage system 520 may contain disk storage 570. Disk storage system 520 may further contain record generator 560, record metadata 530, write cache 590, and read cache 595. For each write to a virtual location mapped to tape storage system 580, record generator 560 may generate a record containing the data, the virtual location, and a sequence value.

Disk storage system 520 may further contain record metadata 530. Record metadata 530 may include tape record tables 540 and record restore table 550. Tape record tables 540 may include a tape record table for each tape cartridge in tape storage system 580 which contains record information for each record location on the respective tape cartridge. Tape record tables 540 may be updated after each record is written to a tape cartridge, including populating the row associated with the record location with information on the record and clearing information from previous entries associated with the virtual disk location. Record restore table 550 may be used during the process of restoring tape record tables 540 and virtual volumes from tape storage system 580. Tape storage system 580 may contain one or more tape drives and one or more tape cartridges for storing records.

Optional write cache 590 may be used for performance of writes. During the host write process, data may be staged in cache 590 before it is written to tape storage system 580. However, the write may be acknowledged to the host immediately after staging.

Optional read cache 595 may be used for the performance of reads. The cache may use standard caching algorithms such as First In, First Out (FIFO) or more advanced predictive algorithms. During the host read process, data may be staged on read cache 595 before it is sent to the host.

To initially configure a system 500 as described herein, a user may physically connect I/O ports on tape library 580 to the host adaptor I/O ports on disk storage system 520. This may be done through a switch as well. The user may configure the connection statistics for tape storage system 580 so that data communication can occur between disk storage system 520 and tape storage system 580. The user may identify a pool of tape cartridges that may be used for pass-through writing. The user may identify virtual locations which will be sequentially written to tape storage system 580. The user may identify a set of tape drives to be used to write to the tape cartridges. The user may also select the size of write cache 590 and read cache 595.

Tape record tables 540 may be configured by disk storage system 520 in response to the user identifying the pool of cartridges. Record restore table 550 may be configured by disk storage system 520 in response to the user initiating the restore process.

Due to the way in which the record writes are done sequentially to the tape cartridges, the writing process may proceed faster with a larger capacity in the cartridge pool. Next free record locations may be more quickly identified and more quickly available for writing a record when there is larger cartridge capacity.

Figure 6:
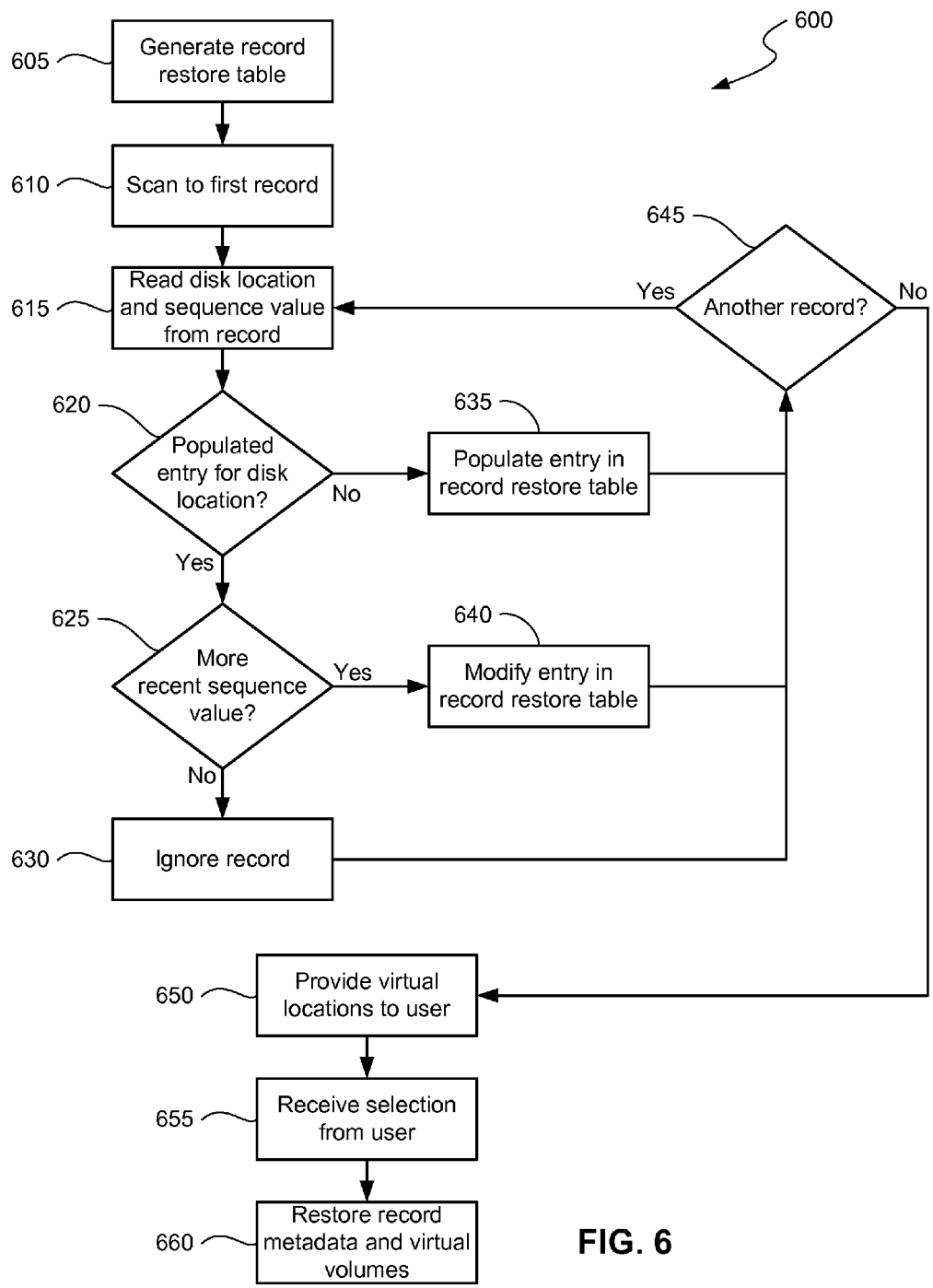
FIG. 6 depicts an example method for restoring pass-through tape access in a disk storage environment.

Referring to FIG. 6, an example method 600 for restoring pass-through tape access in a disk storage environment is depicted. At block 605, a record restore table may be generated. This may be done in response to a user identifying the tape cartridges which are to be used for the restore. At block 610, a first record may be identified by scanning through tape cartridges. At block 615, the virtual location and sequence value are read from the record. These may be read from the header of the record. At block 620, it is determined whether there is a populated entry for the virtual location read off the record. If there is not a populated entry, method 600 may proceed to block 635 and populate an entry in the record restore table. The entry in the record restore table may include the virtual location, record location, and the sequence value. If, at block 620, there is a populated entry for the disk location, method 600 may proceed to block 625.

At block 625, the sequence value from the populated entry may be compared to the sequence value from the record. If the sequence value from the record indicates a more recent record, method 600 may proceed to block 640 and modify the entry in the record restore table to include the record location of the record and sequence value from the record. If, at block 625, the sequence value from the record indicates an older record, method 600 may proceed to block 630 and ignore the record. From blocks 630, 635, and 640, method 600 may proceed to block 645 and scan for another record. If there is another record, method 600 may return to block 615. If there is not another record, method 600 proceeds to block 650 and provides a list of virtual locations that may be restored to a user. The list may include a list of virtual volumes which may be restored. At block 655, a selection of virtual locations to restore is received from the user. At block 660, the selected virtual locations are restored and the record metadata is restored using the record restore table.

Referring to FIG. 7, an example record restore table 700 is depicted. As shown, each entry may include a virtual location (i.e. track ID), record location (tape cartridge and cartridge address), and a sequence number. Table 700 may be populated as described above. For example, a header may be read from a record which contains track ID fb_0001 F. Table 700 does not have an entry for the track ID so, in this example, another row may be populated for the new track ID. In another example, a header may be read from a record with a track ID fb_001D. Table 700 already has an entry for that track ID so the sequence number may determine if the information in the table is updated. In this example, if the sequence number in the header for the record is greater than 189, the tape cartridge, cartridge address and sequence number may be updated for track ID fb_0001 D in table 700.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for pass-through tape access in a disk storage environment, the method comprising:
    receiving, at a disk storage system, a command to write data to a first virtual location, the first virtual location mapped to a tape storage system;
    generating a first record comprising the data, the first virtual location, and a first sequence value, the first sequence value indicating relative sequence when compared to other sequence values;
    writing the first record to a first record location on a first tape cartridge loaded in a tape drive; and
    modifying record metadata on the disk storage system to indicate that the first record location contains the first record.

2. The method of claim 1, further comprising:
    identifying, in the record metadata, information regarding a previous record associated with the first virtual location, the previous record at a second record location; and
    modifying the record metadata to indicate that the second record location is free to be written to.

3. The method of claim 1, further comprising:
    identifying a next free record location on the first tape cartridge using the record metadata; and
    positioning the first tape cartridge at the next free record location.

4. The method of claim 1, further comprising:
    determining the first tape cartridge is full after the writing the first record;

removing the first tape cartridge from the tape drive;
loading a second tape cartridge into the tape drive;
determining a next free record location on the second tape cartridge using the record metadata; and
positioning the second tape cartridge at the next free record location.

5. The method of claim 4, further comprising:
identifying the second tape cartridge as having a most free record locations out of a set of tape cartridges.

6. The method of claim 1, wherein the record metadata comprises a tape record table with record information for specific record locations.

7. The method of claim 6, wherein the modifying the record metadata comprises:
updating an entry in the tape record table associated with the first record location to include information on the first record.

8. The method of claim 1, further comprising:
receiving a read command, at the disk storage system, to read data from a second virtual location, the second virtual location mapped to the tape storage system;
identifying a second record location from the record metadata, the second record location containing a second record, the second record associated with the second virtual location;
positioning, in the tape drive, a second tape cartridge to the second record location;
reading data from the second record.

9. The method of claim 1, further comprising:
generating a record restore table;
scanning a set of tape cartridges in the tape storage system;
reading a second virtual location and a second sequence value from a second record at a second record location; and
populating a first entry in the record restore table, the first entry comprising the second virtual location, the second record location, and the second sequence value.

10. The method of claim 9, further comprising:
reading a third virtual location and third sequence value from a third record at a third record location;
determining the third virtual location matches the second virtual location in the first entry;
determining the third sequence value is more recent than the second sequence value; and
modifying the first entry to include the third record location and the third sequence value.

11. The method of claim 9, further comprising:
determining the record restore table is complete for the set of tape cartridges; and
restoring record metadata using the record restore table.

12. The method of claim 9, further comprising:
determining the record restore table is complete for the set of tape cartridges;
providing a list of virtual locations available to be restored to a user;
receiving a selection of one or more virtual locations from the user; and
restoring record metadata for the selection using the record restore table.

13. A system comprising:
a tape storage system comprising a set of tape cartridges; and
a disk storage system connected to the tape storage system, the disk storage system configured to:
receive a command to write data to a first virtual location, the first virtual location mapped to a tape storage system;
generate a first record comprising the data, the first virtual location, and a first sequence value, the first sequence value indicating relative sequence when compared to other sequence values;
write the first record to a first record location on a first tape cartridge loaded in a tape drive; and
modify record metadata on the disk storage system to indicate that the first record location contains the first record.

14. The system of claim 13, wherein the disk storage system is further configured to:
identify, in the record metadata, information regarding a previous record associated with the first virtual location, the previous record at a second record location; and
modify the record metadata to indicate that the second record location is free to be written to.

15. The system of claim 13, wherein the disk storage system is further configured to:
identify a next free record location on the first tape cartridge using the record metadata; and
position the first tape cartridge at the next free record location.

16. The system of claim 13, wherein the disk storage system is further configured to:
determine the first tape cartridge is full after writing the first record;
remove the first tape cartridge from the tape drive;
load a second tape cartridge into the tape drive;
determine a next free record location on the second tape cartridge using the record metadata; and
position the second tape cartridge at the next free record location.

17. The system of claim 13, wherein the disk storage system is further configured to:
receive a read command to read data from a second virtual location, the second virtual location mapped to the tape storage system;
identify a second record location from the record metadata, the second record location containing a second record, the second record associated with the second virtual location;
position, in the tape drive, a second tape cartridge to the second record location;
read data from the second record.

18. The system of claim 13, wherein the disk storage system is further configured to:
generate a record restore table;
scan a set of tape cartridges in the tape storage system;
read a second virtual location and a second sequence value from a second record at a second record location; and
populate a first entry in the record restore table, the first entry comprising the second virtual location, the second record location, and the second sequence value.

19. The system of claim 18, wherein the disk storage system is further configured to:
read a third virtual location and third sequence value from a third record at a third record location;
determine the third virtual location matches the second virtual location in the first entry;
determine the third sequence value is more recent than the second sequence value; and
modify the first entry to include the third record location and the third sequence value.

20. The system of claim 18, wherein the disk storage system is further configured to:
determine the record restore table is complete for the set of tape cartridges; and restore record metadata using the record restore table.

\* \* \* \* \*